(12) United States Patent
Baumstein et al.

(10) Patent No.: US 11,662,493 B2
(45) Date of Patent: May 30, 2023

(54) METHODOLOGY FOR ENHANCING PROPERTIES OF GEOPHYSICAL DATA WITH DEEP LEARNING NETWORKS

(71) Applicant: ExxonMobil Technology and Engineering Company, Spring, TX (US)

(72) Inventors: Anatoly I. Baumstein, Houston, TX (US); Mehdi Aharchaou, Spring, TX (US); Rongrong Lu, Tomball, TX (US); Junzhe Sun, San Jose, CA (US)

(73) Assignee: ExxonMobil Technology and Engineering Comany, Spring, TX (US)

( * ) Notice: Subject to any disclaimer, the term of this patent is extended or adjusted under 35 U.S.C. 154(b) by 137 days.

(21) Appl. No.: 17/247,598

(22) Filed: Dec. 17, 2020

(65) Prior Publication Data
US 2021/0318458 A1  Oct. 14, 2021

Related U.S. Application Data

(60) Provisional application No. 63/007,147, filed on Apr. 8, 2020.

(51) Int. Cl.
*G01V 1/36* (2006.01)
*G06N 3/08* (2023.01)
*G01V 1/38* (2006.01)

(52) U.S. Cl.
CPC ............ *G01V 1/364* (2013.01); *G01V 1/3808* (2013.01); *G06N 3/08* (2013.01); *G01V 2210/21* (2013.01)

(58) Field of Classification Search
None
See application file for complete search history.

(56) References Cited

U.S. PATENT DOCUMENTS

| 10,198,535 B2 | 2/2019 | Usadi et al. |
| 10,310,113 B2 | 6/2019 | Sun et al. |

(Continued)

OTHER PUBLICATIONS

Kyongmin (Data-driven reconstruction of nonlinear dynamics from sparse observation, Journal of Computational Physics, vol. 395, 2019, pp. 671-689 (Year: 2019).*

(Continued)

*Primary Examiner* — Roy Y Yi
(74) *Attorney, Agent, or Firm* — ExxonMobil Technology and Engineering Company—Law Department

(57) ABSTRACT

A method for enhancing properties of geophysical data with deep learning networks. Geophysical data may be acquired by positioning a source of sound waves at a chosen shot location, and measuring back-scattered energy generated by the source using receivers placed at selected locations. For example, seismic data may be collected using towed streamer acquisition in order to derive subsurface properties or to form images of the subsurface. However, towed streamer data may be deficient in one or more properties (e.g., at low frequencies). To compensate for the deficiencies, another survey (such as an Ocean Bottom Nodes (OBN) survey) may be sparsely acquired in order to train a neural network. The trained neural network may then be used to compensate for the towed streamer deficient properties, such as by using the trained neural network to extend the towed streamer data to the low frequencies.

19 Claims, 17 Drawing Sheets

(56) References Cited

U.S. PATENT DOCUMENTS

| | | |
|---|---|---|
| 10,459,096 B2 | 10/2019 | Tan et al. |
| 2011/0255371 A1* | 10/2011 | Jing .................. G01V 1/288 |
| | | 367/73 |

OTHER PUBLICATIONS

Temizel, et al. "Data-Driven Analysis of Natural Gas EOR in Unconventional Shale Oils." Apr. 2019 Paper presented at the SPE Oklahoma City Oil and Gas Symposium, Oklahoma City, Oklahoma, USA (p. 15) (Year: 2019).*

Hu, W. (2014) "FWI without Low Frequency Data-beat Tone Inversion", 24th Annual International Meeting, SEG, Expanded Abstracts, pp. 1116-1120.

Jin, Y. et al. (2018) "Learn Low Wavenumber Information in FWI via Deep Inception Based Convolutional Networks", 88th Annual International Meeting, SEG, Expanded Abstracts, pp. 2091-2095.

Ovcharenko, O. et al. (2018) "Low-Frequency Data Extrapolation Using a Feed-Forward ANN", 80th EAGE Conference and Exhibition, Expanded Abstracts, 5 pgs.

Sun, H. and L. Demanet (2018) "Low Frequency Extrapolation with Deep Learning", 88th Annual International Meeting, SEG, Expanded Abstracts, pp. 2011-2015.

Van den Oord, A. et al. (2016) "Wavenet: A generative Model for Raw Audio", arXiv, 2016, pp. 1-15.

\* cited by examiner

METHODOLOGY FOR ENHANCING PROPERTIES OF GEOPHYSICAL DATA WITH DEEP LEARNING NETWORKS

CROSS REFERENCE TO RELATED APPLICATION

This application claims the benefit of priority of U.S. Provisional Application No. 63/007,147, filed Apr. 8, 2020, the disclosure of which is incorporated herein by reference in its entirety.

TECHNICAL FIELD

This disclosure relates generally to the field of geophysical prospecting and, more particularly, to acquisition and processing of seismic data. Specifically, the disclosure relates to a methodology for compensating deficiencies in one geophysical dataset by extracting information from a different geophysical dataset.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Geophysical measurements provide essential information for petroleum exploration. For example, during a seismic survey of a subterranean region, geophysical data may be acquired by positioning a source of sound waves at a chosen shot location, and measuring back-scattered energy generated by the source using receivers placed at selected locations. The measured reflections are referred to as a single "shot record". Many shot records are measured during a survey by moving the source and receivers to different locations and repeating the aforementioned process.

For instance, seismic data may be collected using towed streamer acquisition in order to derive subsurface properties, such as velocity or impedance, or may be used to form images of rocks. However, using towed streamer acquisition may limit the collected data to a certain bandwidth, such as a range of useful frequencies that are strong enough relative to the noise. In particular, conventional streamer marine seismic acquisition operates within a limited frequency band, such as in the range of 4-60 Hz. This is illustrated in FIG. 1, which shows a diagram 100 of seismic bandwidth that is in the range of 4-60 Hz for modern-day streamers. Though, the useful frequency band may vary with depth because higher frequencies attenuate faster as they propagate through the subsurface. In this regard, various frequency ranges are contemplated including upper limits of 80 Hz, 100 Hz, 125 Hz, or more.

As one example, for towed streamer data, ultra-low frequencies (e.g., less than 4 Hz) may be unreliable due to ghosts. As one example, a source or receiver ghost may refer to the destructive interference, which may occur when sources and receivers are positioned just below the free surface (e.g., at a depth typically in the range of 3-20 m), between the primary wavefield and its slightly delayed version which arrives at the same location with opposite polarity after reflecting downward from the free surface. In order to compensate for ghost, one may attempt to boost the signal; however, because of excessive noise, boosting the signal may be unwarranted. Specifically, towed streamer data may exhibit weak signal-to-noise (S/N), which may be caused several factors, such as weather-related noise, swell noise and flow noise. Thus, boosting the signal will in turn boost the noise. Nevertheless, these ultra-low frequencies may be crucial for accurate inversion of subsurface properties, as discussed further below.

As another example on the other end of the spectrum, high frequencies (e.g., greater than 60 Hz) may likewise be crucial for obtaining high-resolution seismic images. These high frequencies may suffer from a similar issue as the low frequencies in becoming overwhelmed by several noise factors (e.g., earth ambient noise, absorption, etc.) thereby limiting their use.

In this regard, the absence of good quality low and high frequencies from seismic bandwidth impacts the accuracy of all derivative products about the subsurface which aid in the search for oil and gas. In order to obtain these ultra-low frequencies, special acquisition types, such as ocean bottom nodes (OBN), ultra-shallow tow data (from an ultra-shallow towed streamer), and near field hydrophones (NFH), may provide acceptable S/N for the ultra-low frequencies. Extending low frequencies using OBN examples and extending high frequencies using ultra-shallow tow examples are illustrated in diagram 100 in FIG. 1A.

While specialized acquisition (e.g., ultra-shallow or ultra-deep tow, low frequency sources) is capable of enhancing either the low or the high frequencies, these specialized surveys are costly, typically sacrifice one end of the bandwidth spectrum to enhance the other, and rarely cover wide areas which may be of interest in seismic exploration. The lack of low frequencies, such as in the range 1-4 Hz, has an outsized detrimental effect on the effectiveness of advanced velocity model building techniques, such as Full wavefield Inversion (FWI). Enhancing streamer data to include this missing frequency band would allow FWI to more effectively correct the shape of salt bodies and, more generally, avoid cycle skipping and the associated convergence to a local minimum far away from the true velocity model.

As is often the case, a first complete towed streamer survey is performed in order to generate images of the subsurface. Afterwards, the towed streamer survey may be deemed inadequate (e.g., sections of the subsurface need greater detail). As such, a second complete OBN survey is performed in order to improve images of the subsurface (e.g., the OBN survey data is processed in combination with the towed streamer survey data in order to ensure compatibility). An example depiction 150 of the velocity model is illustrated in FIG. 1B. The velocity model may be used to create an image by migrating seismic data or for simulating synthetic data.

Another method is to avoid performing additional acquisition by reconstructing low frequencies in a single (e.g., towed streamer) survey through a variety of approaches. Hu (2014) proposed recovering low-frequency information from two nearby higher frequencies. Jin et al. (2018) later extended this method to work in conjunction with convolutional neural networks (CNNs). Sun and Demanet (2018) proposed generating pairs of high- and low-frequency seismic datasets using numerical modeling and train a CNN to reconstruct low-frequency data from its high frequency counterpart. Ovcharenko et al. (2018) suggest using a slightly different neural network architecture and random velocity models to generate the low- and high-frequency synthetic data which would allow subsequent application of the trained neural networks to field datasets.

SUMMARY

A computer-implemented method of enhancing geophysical datasets is disclosed. The method includes: accessing a first geophysical dataset obtained via a first geophysical data gathering technique and a second geophysical dataset via a second geophysical data gathering technique, wherein the first geophysical data gathering technique is of a different type than the second geophysical data gathering technique, wherein the first geophysical dataset and the second geophysical dataset include at least one common attribute, wherein the first geophysical dataset is lacking at least one feature due to greater noise or due to a failure to obtain the at least one feature than in the second geophysical dataset; training a neural network using at least part or all of the second geophysical dataset in order for the trained neural network to reconstruct the at least one feature; and applying the trained neural network by inputting at least a part of the first geophysical dataset to the trained neural network in order for the trained neural network to reconstruct the at least one feature for the first geophysical dataset.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION

Figure 1A:
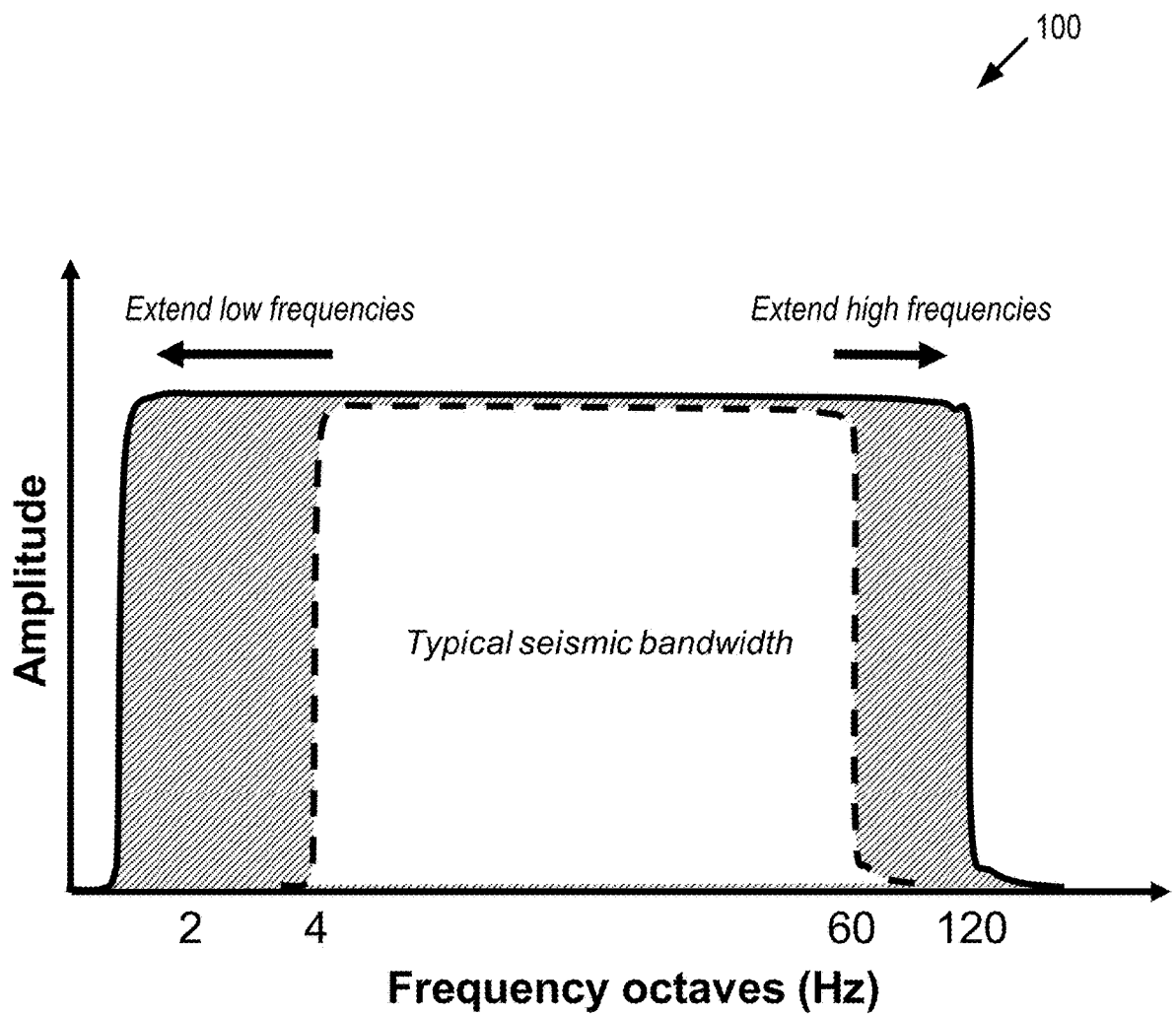
FIG. 1A is a graph of an example of typical seismic bandwidth and extensions at low and high frequencies.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying and interpretation process, including displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or interpretation quantities, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying and interpretation process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

Subsurface model is a numerical, spatial representation of a specified region in the subsurface.

Geologic model is a subsurface model that is aligned with specified faults and specified horizons.

Reservoir model is a geologic model where a plurality of locations have assigned properties including any one, any combination, or all of rock type, environment of deposition (EoD), subtypes of EoD (sub-EoD), porosity, permeability, fluid saturations, etc.

For the purpose of the present disclosure, subsurface model, geologic model, and reservoir model are used interchangeably unless denoted otherwise.

Stratigraphic model is a spatial representation of the sequences of sediment and rocks (rock types) in the subsurface.

Structural model or framework results from structural analysis of reservoir based on the interpretation of 2D or 3D seismic images. For examples, the reservoir framework comprises horizons, faults and surfaces inferred from seismic at a reservoir section.

Machine learning is a method of data analysis to build mathematical models based on sample data, known as training data, in order to make predictions and or decisions without being explicitly programmed to perform the tasks.

Machine learning model is the mathematical representation of a process, function, distribution or measures, which includes parameters determined through a training procedure.

Generative network model (also referred as a generative network to avoid the ambiguity with subsurface models) is an artificial network that seeks to learn/model the true distribution of a dataset giving it the ability to generate new outputs that fit the learned distribution.

Parameters of (generative or discriminator) network are weights or parameters of the neural or convolutional networks, which may be determined through training process.

Hyper-parameters of network are the parameters defining the architecture of the network/model (e.g., number of filters in the convolutional neural networks, number of layers, convolutional filter sizes), the parameters defining training process (e.g., learning rate), which may be determined manually or using a reinforcement learning or Bayesian optimization method.

Training (machine learning) is typically an iterative process of adjusting the parameters of a neural network to minimize a loss function which may be based on an analytical function (e.g., binary cross entropy) or based on a neural network (e.g., discriminator).

Objective function (a more general term for loss function) is a measure of the performance of a machine learning model on the training data (e.g., binary-cross entropy), and the training process seeks to either minimize or maximize the value of this function.

Adversarial training process for generative networks is a training process where the overall objective function that is being minimized or maximized includes a term related to the objective function of an adversary, also termed a discriminator. In this process both the generator and discriminator are typically trained alongside each other.

Generative Adversarial Network (GAN) is an artificial network system including generator (or interpreter) and discriminator network used for training the generative network model.

As used herein, "hydrocarbon management" or "managing hydrocarbons" includes any one, any combination, or all of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, towed streamer data typically fails to be reliable in the low frequency range (e.g., 1-4 Hz). Further, certain previous solutions, such as those that reconstruct low frequencies, rely on training neural networks using synthetic datasets and then applying the trained networks to field data. Differences in character of both signal and noise between synthetic and field data make using the trained neural networks with the synthetic datasets lacking.

Thus, in one or some embodiments, at least two sampled surveys are obtained, in which the at least two sampled surveys (each with associated datasets) are similar in at least one aspect and different in at least another aspect. As discussed further below, the at least two sampled surveys are used in combination (such as training a neural network with at least one sampled survey and applying the neural network using at least another sampled survey) in order to supplement a feature that is lacking in one of the surveys.

In one or some embodiments, the two sampled surveys may be similar in that they are correlated to one another in the at least one aspect. In one or some embodiments, correlation comprises that the two sampled surveys are taken from the same specific geographical area (e.g., the same subsurface field). Alternatively, correlation comprises that the two sampled surveys are obtained from the same regional area (e.g., a same region of the world, such as the Mediterranean, or the Gulf of Mexico). Alternatively still, correlation comprises that the two sampled surveys are taken from the same type of subsurface. In this way, in geological terms, the two sampled surveys are obtained from similar depositional environments so that the geology for the two sampled surveys have common characteristics.

Further, in one or some embodiments, the two sampled surveys may be dissimilar in one or more ways. As one example, the two sampled surveys may be of different types, with a first survey of a first type not having a desired feature (e.g., because the desired feature is not included in the dataset from the first survey or because there is excessive noise in the dataset thereby making the desired feature inaccessible) and a second survey of a second type having the desired feature.

In one or some embodiments, there may be multiple differences between the first survey (that generates a first dataset) and the second survey (that generates a second dataset), such as different types of surveys and different amounts of data from the datasets available. For example, the second survey of the second type may comprise less data (e.g., sparser data) as compared to typical second surveys and/or compared to the amount of data in the first dataset from the first survey of the first type. For example, the second dataset from the second survey has been obtained with receivers that are further spaced apart, as compared to the typical arrangement in obtaining data of the second type, and/or as compared to the arrangement of receivers that was used to obtain the first dataset from the first survey.

In one or some embodiments, part or all of the second dataset from the second survey may be used to train a neural network, with part or all of the first dataset from the first survey then being used as input to the trained neural network in order to recreate or generate the desired feature that is lacking in the first dataset from the first survey. As one example, only part or all of the second dataset (without using another geophysical dataset) is used as input to train the neural network. As another example, part or all of the second dataset in combination with another geophysical dataset (such as a single other geophysical dataset or a plurality of other geophysical datasets) are used as input to train the neural network. In this regard, using part or all of the second dataset to train the neural network includes either training the neural network only with data from the second dataset or training the neural network with data from the second dataset and data from one or more other geophysical datasets. As part of training the neural network, the second dataset from the second survey may be divided or partitioned into two or more parts, with a first part of the second dataset not including the desired feature and a second part of the second dataset including the desired feature. The neural network may be trained using supervised learning in which the first part of the second dataset (which lacks the desired feature) acts as the input to the neural network and in which the second part of the second dataset (which includes the desired feature) acts as the desired output from the neural network. In this way, the neural network via the supervised learning may implicitly and sufficiently encode the desired feature in the subsurface geology (e.g., underneath the acquisition area of the surveys). So that, the trained neural network may generate the desired feature for the first survey responsive to inputting part or all of the first dataset (which lacks the desired feature).

One or more desired features, not present in the first dataset from the first survey, may be generated by the trained neural network. In one or some embodiments, one or more frequencies (such one or more specific frequency bands) not present in the first survey (either due to a lack of the one or more frequencies or due to excessive noise in the one or more frequencies) may be generated by the trained neural network.

In this way, one need not acquire two densely sampled surveys over the same area. Instead, by using one type of field data, which does have the desired feature (e.g., the desired frequency band or azimuth) but is sparsely sampled, may be used to train a neural network. Then, the trained neural network may be applied to another type of data, which is more densely sampled but needs enhancement of the desired feature (e.g., bandwidth enhancement or azimuth widening).

Sparseness of data may be defined in one or more ways, such as either or both of a number of receivers to obtain the dataset and/or a spacing between receivers to obtain the dataset. As one example, in one or some embodiments, sparseness may be defined as obtaining less data than is typically obtained for data of that type. As discussed in more detail below, OBN data may be acquired sparsely in order to generate desired feature(s) for a towed streamer dataset. For the OBN data acquisition, OBN receivers (e.g., point OBN receivers) are conventionally deployed to be spaced 400 m apart from each other. In one or some embodiments, the OBN receivers for sparse data acquisition are deployed at least 2 km away from each other. In particular, the OBN receivers may be spaced in a range of 2-5 km away from each other. The spacing between OBN receivers may be dependent on the complexity of the subsurface geology. More complex subsurface geology results in closer spacing of the OBN receivers whereas less complex subsurface geology results in further spacing of the OBN receivers. In this regard, in one or some embodiments, the spacing of the OBN receivers to obtain the sparse dataset comprises: at least 5 times greater spacing than conventional OBN receiver spacing; at least 6 times greater spacing than conventional OBN receiver spacing; at least 7 times greater spacing than conventional OBN receiver spacing; at least 8 times greater spacing than conventional OBN receiver spacing; at least 9 times greater spacing than conventional OBN receiver spacing; or at least 10 times greater spacing than conventional OBN receiver spacing. Thus, with the greater spacing, the cost associated with obtaining the OBN dataset may be lower.

Alternatively, or in addition, sparseness of obtaining one type of data (e.g., OBN data) may be defined based on a comparison of the amount of data obtained for the other type of data (e.g., towed streamer data). Receivers (e.g., hydrophones) to obtain the towed streamer data may be spaced a certain distance apart (e.g., typical spacing of receivers along a streamer (e.g., cable) is 6.25-12.5 m). In contrast, the receivers to obtain the OBN data may be spaced further part than the certain distance used to space the towed streamer receivers. For example, the spacing of the OBN receivers may be: at least at least 5 times greater spacing than the towed streamer receiver spacing; at least at least 6 times greater spacing than the towed streamer receiver spacing; at least at least 7 times greater spacing than the towed streamer receiver spacing; at least at least 8 times greater spacing than the towed streamer receiver spacing; at least at least 9 times greater spacing than the towed streamer receiver spacing; at least at least 10 times greater spacing than the towed streamer receiver spacing; at least 100 times greater spacing than the towed streamer receiver spacing; or at least 1000 times greater spacing than the towed streamer receiver spacing.

As still another example, sparseness may be defined based on a number of receivers used and/or a number of shots implemented. As discussed in more detail below, near-field hydrophone (NFH) may be used to extend the bandwidth for a higher frequency range. Specifically, NFH receiver(s), capable of recording higher frequencies than conventional towed streamer receivers, may be used. Specifically, typical hydrophones may be used to record the towed streamer data, may number in the thousands (e.g., at least 8,000) and may be spread along the cables that run several kilometers (e.g., 8-12 km). Similar to sparsely obtaining OBN data, a sparse number of NFHs (e.g., less than 10, less than 5, or no more than 2), with each NFH positioned proximate (e.g., approximately 1 meter above) each source (e.g., air gun). In one implementation, two sources are used, with an NFH positioned above each source. Thus, by design, sparse data from the NFH (which are at least one order of magnitude, at least two orders of magnitude, or at least three orders of magnitude less than the number of typical hydrophones) may be generated in order to compensate for the unreliability of the high frequency towed streamer data. Further, the sparse methodology may record high frequencies for a fraction of shots (e.g., recording no more than every $2^{nd}$ shot; recording no more than every $3^{rd}$ shot; recording no more than every 4th shot; etc.). In this way, the dataset may be obtained more sparsely and economically.

As one example, the towed streamer data, which may comprise the first dataset, may have data in a lower frequency band (such as 1-4 Hz) that is unreliable due to excessive noise. OBN data, which may comprise the second dataset and may be sparsely sampled, may have data that is reliable in the lower frequency band (e.g., 1-4 Hz). In preparation for supervised machine learning, the OBN data may be split into different frequency bands (e.g., different shots split into pairs of frequency bands) with a higher frequency band (e.g., 4-15 Hz) and the lower frequency band (e.g., 1-4 Hz). In this way, the OBN data may be split into a first OBN portion and a second OBN portion, with the first OBN portion at least partly not including the desired feature of bandwidth (or entirely not including the desired feature of bandwidth) and the second OBN portion at least partly including the desired feature of bandwidth (or entirely including the desired feature of bandwidth). As one example, the second portion may include the desired bandwidth and outside the desired bandwidth (such as the entire spectrum). Thus, actual low- and high-frequency pairs from OBN gathers recorded in the field may be extracted in order to train the neural network to reconstruct low frequencies from high frequencies. In this way, the neural network may be subject to supervised learning with the higher frequency band as input to the neural network and the lower frequency band as the desired output from the neural network. After training, the towed streamer data, which has reliable data in the same or similar range as the OBN higher frequency band (e.g., 4-15 Hz) may be input to the trained neural network in order for the trained neural network to output the lower frequency band (e.g., 1-4 Hz) of towed streamer data. In this way, the neural network, trained with sparse OBN data, may be used to output towed streamer data in a lower frequency range that is more reliable than towed streamer data obtained directly.

Further, with this methodology, bandwidth extension may rely on extracting information from actual field data, with the two datasets correlated in at least one aspect (e.g., the datasets are acquired over the same general area). Because actual field data is used, the need to generalize from synthetic to field data is obviated. Further, to make the methodology economical, one dataset may be sparsely obtained (e.g., a sparse set of OBN receivers may be deployed while streamer marine acquisition is taking place, as only a few receivers may be sufficient to perform the required training of neural networks), as discussed above.

In one or some embodiments, wideness of azimuth not present in the first survey (such as due to being limited to narrow azimuth data) may be generated by the trained neural network. As one example, the towed streamer data may be obtained with one vessel towing an array of streamers and source(s), thereby limiting the towed streamer data to a narrow azimuth. In contrast, the OBN data may comprise wide azimuth data (even with sparse OBN data generated by a single vessel shooting into stationary ocean-bottom receivers). Again, in preparation for supervised machine learning, the wide-azimuth OBN data may be split into narrow-azimuth part (e.g., with azimuth and offset rangers mirroring those of the towed streamer data) and the complementary wide-azimuth part. In turn, the neural network may be subject to supervised learning with the narrow-azimuth part as input to the neural network and the wide-azimuth part desired output from the neural network. After training, the towed streamer data, which has only the narrow-azimuth part may be input (e.g., either only part of the towed streamer data or the entirety of the towed streamer data) to the trained neural network in order for the trained neural network to output towed streamer data with wide-azimuth.

Thus, the neural network training may implicitly encode the subsurface geology so that application of the trained neural network may extrapolate narrow-azimuth conventional towed-streamer data to wide azimuth by transferring wide azimuth information from a collocated sparse OBN survey, similar to the low-frequency augmentation described above. In this way, the neural network, trained with sparse OBN data, may be used to output towed streamer data to compensate for a desired feature (e.g., wideness of azimuth) that may not be otherwise present in the towed streamer data.

In still an alternate embodiment, the neural network may generate multiple desired features, such as both frequency bandwidth extension and azimuth extension, in the first dataset (such as in the towed streamer data). Further, separate from frequency and azimuth, other desired features are contemplated.

In addition, various combinations of different types of data are contemplated including: OBN data and conventional towed-streamer data; low-frequency towed streamer and conventional towed-streamer data; near-field hydrophone (NFH) and conventional towed-streamer data (e.g., to reconstruct high frequencies in the conventional towed-streamer data); or to any two (or more) types of geophysical datasets where one has the desired information and the other is in need of augmenting with this information.

Figure 2A:
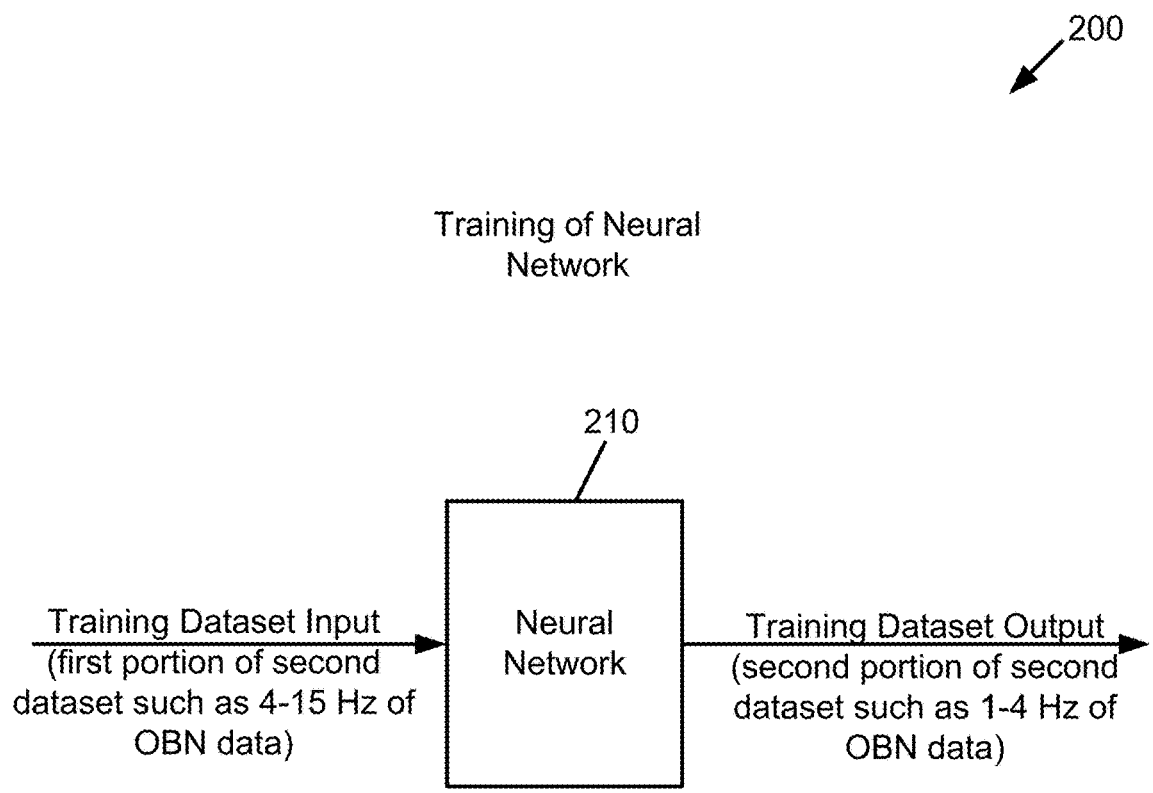
FIG. 2A is a block diagram for training a neural network.

Referring to the figures, FIG. 2A is a block diagram 200 for training a neural network 210. As discussed above, multiple sampled surveys may be obtained, with a first dataset from first survey not including a desired feature and a second dataset from a second survey (either partly or wholly) including the desired feature. In preparation for training the neural network, the second dataset from the second survey may be segmented or divided into at least two parts, such as a first portion of the second dataset that does not include the desired feature and a second portion of the second dataset that does include the desired feature. As one example in extending bandwidth to a lower frequency range (e.g., 1-4 Hz), a second dataset may be generated from an OBN survey, with the second dataset being split separately into a lower frequency range (e.g., low-frequency patches) and a higher frequency range (e.g., high-frequency patches), such as 200 traces by 500 time samples, though other numbers are contemplated depending on time and spatial sampling. Specifically, the second dataset may be split with the first portion being image patches outside of the lower frequency range (e.g., 4-15 Hz) and the second portion being image patches within the lower frequency range (such as at least partly or wholly within the lower frequency range, such as 1-4 Hz). As another example in widening azimuth, a wide-azimuth OBN dataset may be split into narrow-azimuth part (with azimuth and offset rangers mirroring those of the towed streamer data) as the first portion and the complementary wide azimuth part as the second portion.

In one or some embodiments, the first portion and the second portion of the second dataset are used for training the neural network 210. In the example of bandwidth extension, the pairs of patches may be provided to the training algorithms. Various optimization routines are contemplated. As one example, Keras/Tensorflow may be used for building and training deep learning models. Other optimization routines are contemplated (e.g., ADAM optimization algorithm; stochastic gradient descent). For training, one or more parameters may be supplied. For example, "batch size", which is the number of patches to use in a single gradient calculation, may be supplied as one parameter. In one or some embodiments, "batch size" is selected to be between 1-8, so the total number of traces in a single gradient calculation may be anywhere between 200 and 1600 (though other selections are contemplated). In this way, training is not performed for each shot pair, but for groups of 200-1600 traces. The choice of traces (e.g., patches) may change from one gradient calculation to the next in a random fashion, which may be automatically performed by the optimization routine.

Figure 2B:
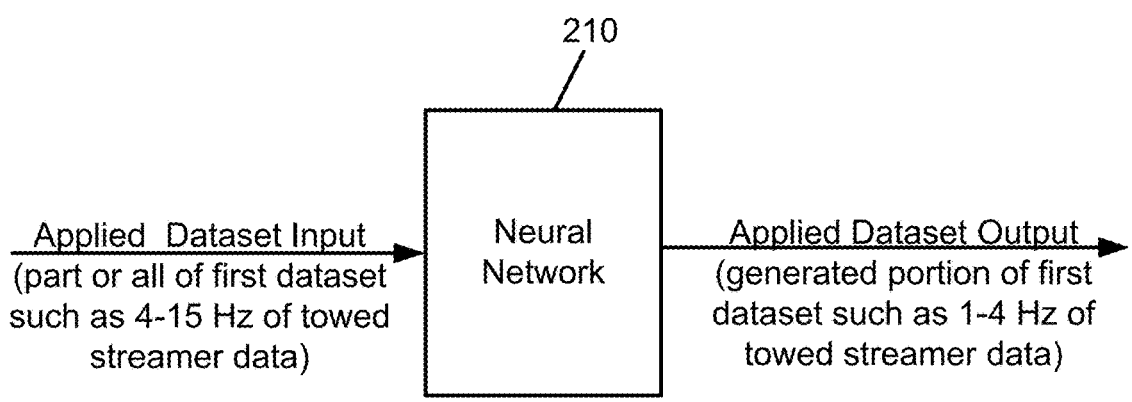
FIG. 2B is a first block diagram for applying the neural network that was trained in FIG. 2A.

FIG. 2B is a first block diagram 230 for applying the neural network 210 that was trained in FIG. 2A. As shown in FIG. 2B, the input to the neural network 210 is an applied dataset. For example, in the instance where a first dataset that does not include the desired feature, the part or all of the first dataset may be input to neural network. In particular, towed streamer data may include reliable data from 4-56 Hz. Part or all of the towed streamer data (such as data from 4-15 Hz) may be input to neural network 210. In this way, the data input when applying the neural network 210 may be the same range (e.g., towed stream data in the range of 4-15 Hz) as was used when training the neural network 210 (e.g., OBN data in the range of 4-15 Hz). Alternatively, the range of the data input when applying the neural network 210 may at least partly overlap with the input range used when training the neural network 210.

Responsive to the input, the neural network 210 may generate an applied dataset output, such as a generated portion for the towed streamer data in the range of 1-4 Hz. Again, the neural network 210 may output the same range (e.g., 1-4 Hz of towed streamer data) for the first dataset as the output that was used to train the neural network 210 (e.g., 1-4 Hz of OBN data). Alternatively, the range of the data output when applying the neural network 210 may at least partly overlap with the output range used when training the neural network 210.

Figure 2C:
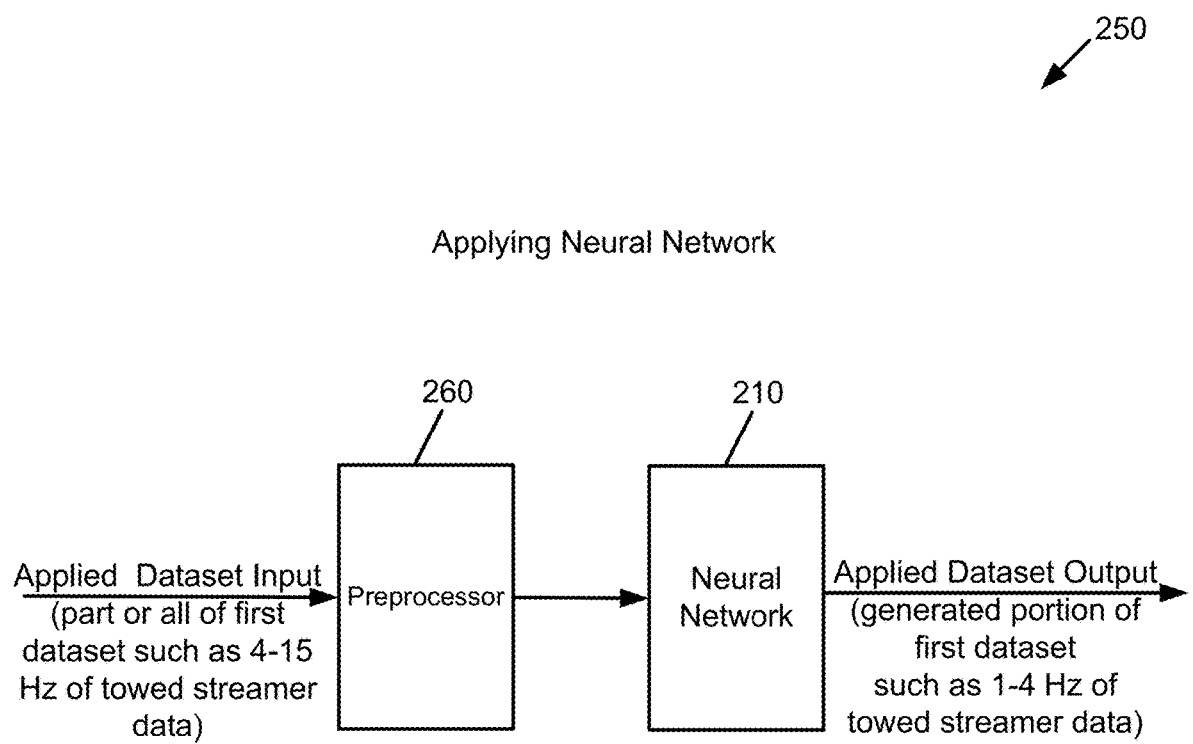
FIG. 2C is a second block diagram for applying the neural network that was trained in FIG. 2A.

FIG. 2C is a second block diagram 250 for applying the neural network 210 that was trained in FIG. 2A. As shown in FIG. 2C, the applied dataset for input to the neural network 210 may be preprocessed by preprocessor 260. For example, the towed streamer data may be preprocessed by preprocessor 260 in order for the towed streamer data to "look" more similar to the OBN data that was used as input to train neural network 210.

Various types of preprocessing are contemplated including any one, any combination, or all of: source and receiver redatuming (wherein recorded wavefields are modified in accordance with the wave equation to look as if sources and/or receivers were located at a different depth, e.g., at the same depth as sources and receivers used in the OBN survey), linear moveout (e.g., processing step that moves the samples in a seismic trace up or down in time by a number of seconds linearly proportional to the offset (e.g., source-receiver distance)); static shift (e.g., static corrections); normal moveout (NMO) (e.g., one type of migration processing step that describes the temporal change associated with a reflection event associated with a change in the distance between a source and receiver); or migration (e.g., processing step by which seismic events are geometrically re-located in either space or time to the location the event occurred in the subsurface rather than the location that it was recorded at the surface).

For example, because the receivers to generate the towed streamer data may be placed differently that the receivers to generate the OBN data, recorded events for towed stream data may be at a different time than a recorded event in OBN (e.g., different paths to travel to the respective receivers). As such, preprocessing may be performed in order to align the towed streamer dataset to the OBN dataset.

Though not depicted in FIG. 2C, in one or some embodiments, a postprocessing step (using a postprocessor) may be used to postprocess the applied dataset output. For example, depending on the type of preprocessing applied to the towed streamer data, a postprocessing step may be applied. In particular, responsive to applying a moveout correction (e.g., static shift, NMO, migration) as a preprocessing step, a postprocessing step may be applied in order to back out the moveout correction after prediction. Alternatively, a postprocessing step need not be applied. For example, if preprocessing comprises amplitude scaling or wavelet shaping (e.g., changing wavelet phase and amplitude), then a postprocessing step need not be used as attributes, such as absolute scaling of the data, may not be important for subsequent processing.

Figure 3A:
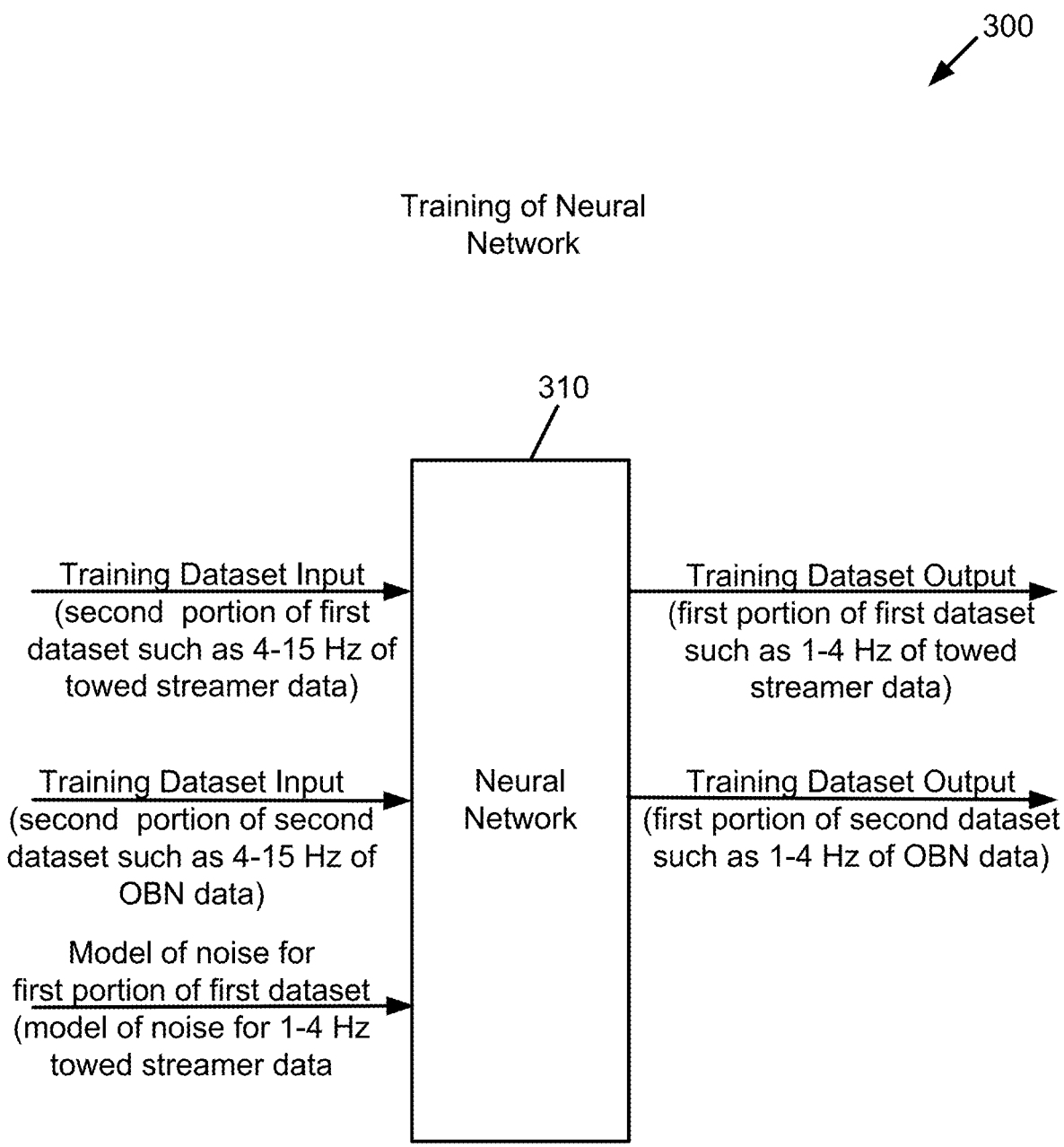
FIG. 3A is a block diagram for training a neural network.

FIG. 3A is a block diagram 300 for training a neural network 310. As discussed above, in certain instances, the first dataset may not include the desired feature due to excessive noise (e.g., towed streamer data in the range of 1-4 Hz may be unreliable due to excessive noise). In that regard, the first dataset may still be of use in training the neural network 310. As such, in addition to splitting the second dataset into a first portion (as output) and a second portion (as input) for training, similar to FIG. 2A, the first dataset may likewise be split, such as into a first portion (as output, such as 1-4 Hz of the towed streamer data) and a second portion (as input, such as 4-15 Hz of the towed streamer data) for training. Further, a model of noise may optionally be input to neural network 310. Various models of the noise are contemplated. As one example, while the sources are inactive, the receivers may nonetheless still record ambient noise. The ambient noise recording may be used to teach the neural network to remove noise from active shot records. Further, training of neural network 310 may be performed as outlined above.

Figure 3B:
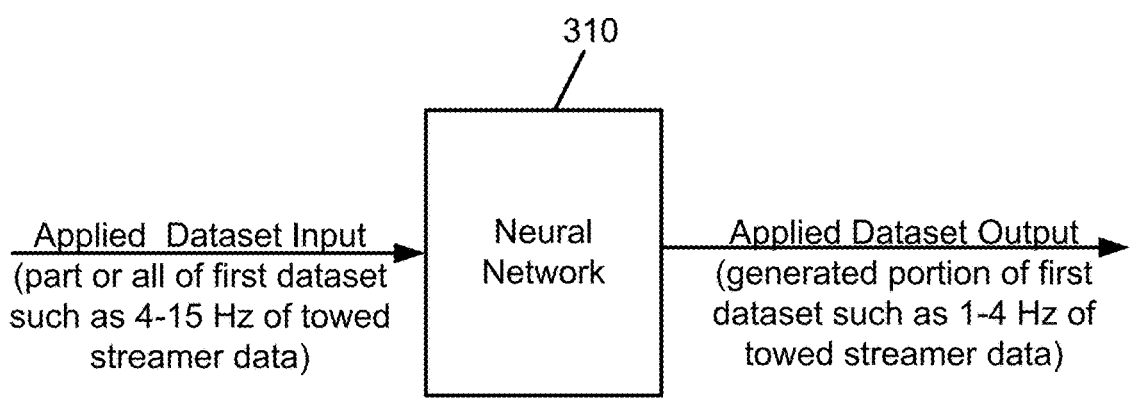
FIG. 3B is a block diagram for applying the neural network that was trained in FIG. 3A.

FIG. 3B is a block diagram 350 for applying the neural network 310 that was trained in FIG. 3A. In particular, after training the neural network 310, an applied dataset may be input in order for the neural network 310 to generate an applied dataset output.

Figure 4:
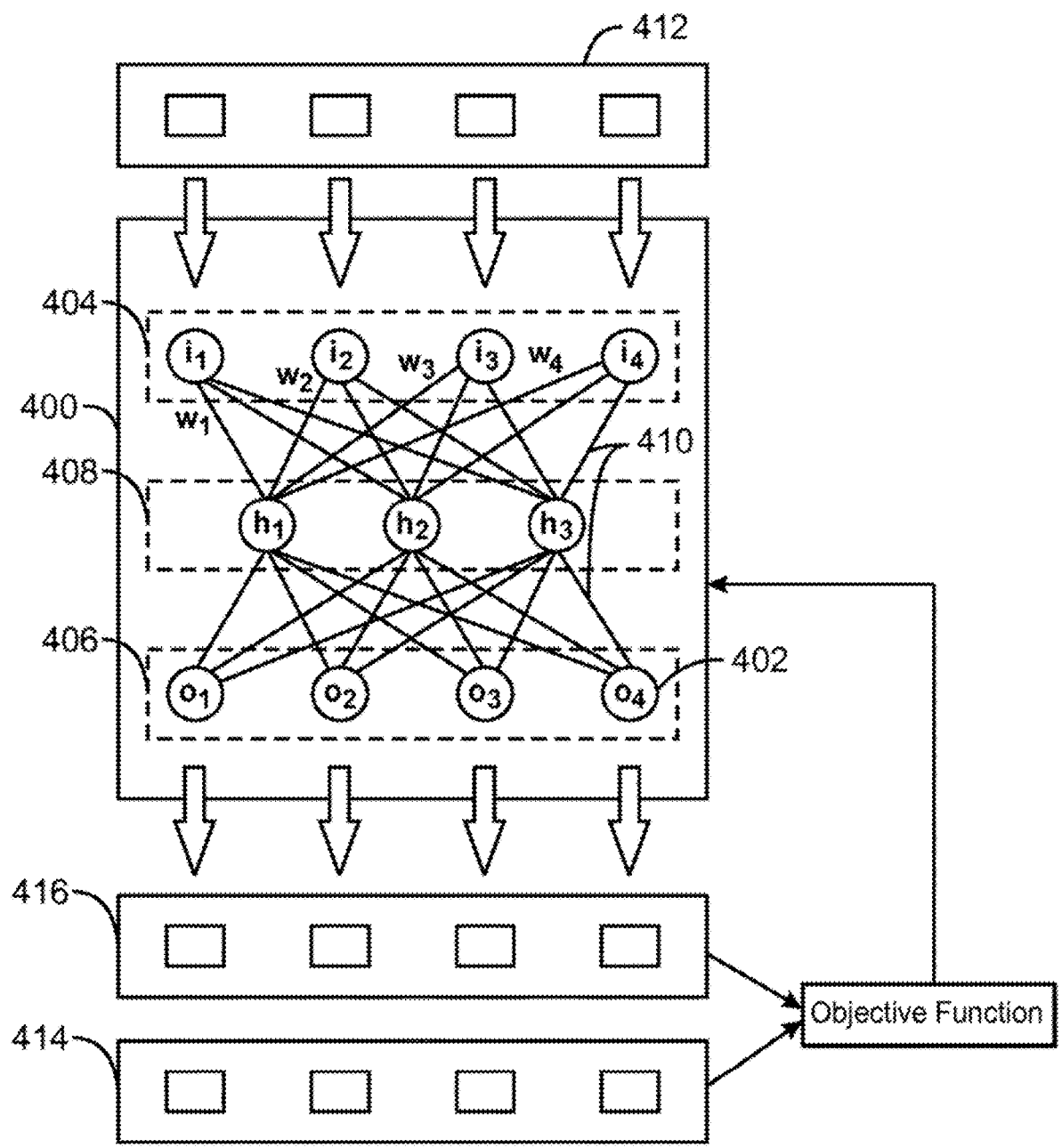
FIG. 4 is a schematic view of an exemplary neural network.

FIG. 4 is a schematic view of an exemplary neural network 400 that may be used in embodiments of the present methodologies. An example of a neural network is disclosed in U.S. Pat. No. 10,198,535, incorporated by reference herein in its entirety. The neural network 400 may include a network of nodes 402. The neural network 400 may include an input layer 404, an output layer 406 and one or more hidden layers 408. Each node 402 in a layer may be connected to the nodes 402 of a preceding layer by a connection 410 characterized by a weighting value, w. The value computed for any given node may be a function of the values at each connected node in the preceding layer modified by the weighting values, w.

A training dataset including a set of inputs 412 and a dataset of desired outputs 414 may be used to train the neural network 400, e.g., to set the values of the weights. A set of inputs 412 may be fed into the input layer 404 of the neural network 400. Node values may then be computed for each node in the hidden layer 408. If the neural network includes more than one hidden layer 408, node values may be successively computed for each subsequent hidden layer 408. Node values may then be computed for the output layer 406 to generate a set of outputs 416 of the neural network. The set of outputs 416 may be compared to a desired output set 414 to determine a measure of the deviation, sometimes referred to as an "objective function" or "loss function," between the set of computed outputs 416 and the desired output set 414. The desired output set 414 may be generated by a full-physics simulation of the system under consideration or based on measured characteristics of the system. The objective function computed for one iteration of the neural network computation may be used to alter the weighting values applied to each of the node connections 410 for the next iteration of the neural network computation. The neural network may be iteratively computed and the calculation of the objective function repeated until the objective function is below an acceptable threshold. After the last iteration of the neural network, the weight values correspond to an approximation of the response function of the system under consideration.

It will be appreciated that the exemplary neural network described herein is used to introduce concepts of machine learning. In actual practice, the neural network may be any suitable neural network, including any number of hidden layers 408 and any number of nodes 402 per layer, as well as any other proper topology of neuron connections. Further, it will be appreciated that embodiments may include other supervised machine learning techniques, such as probabilistic trees, support vector machines, radial basis functions, GANs (generational adversarial network, described above) and cGANs (conditional GANs, such as in which the input to the generative model is conditioning data (e.g., geophysical data, petrophysical data and structural framework) and noise)), and other machine learning techniques.

Figure 5A:
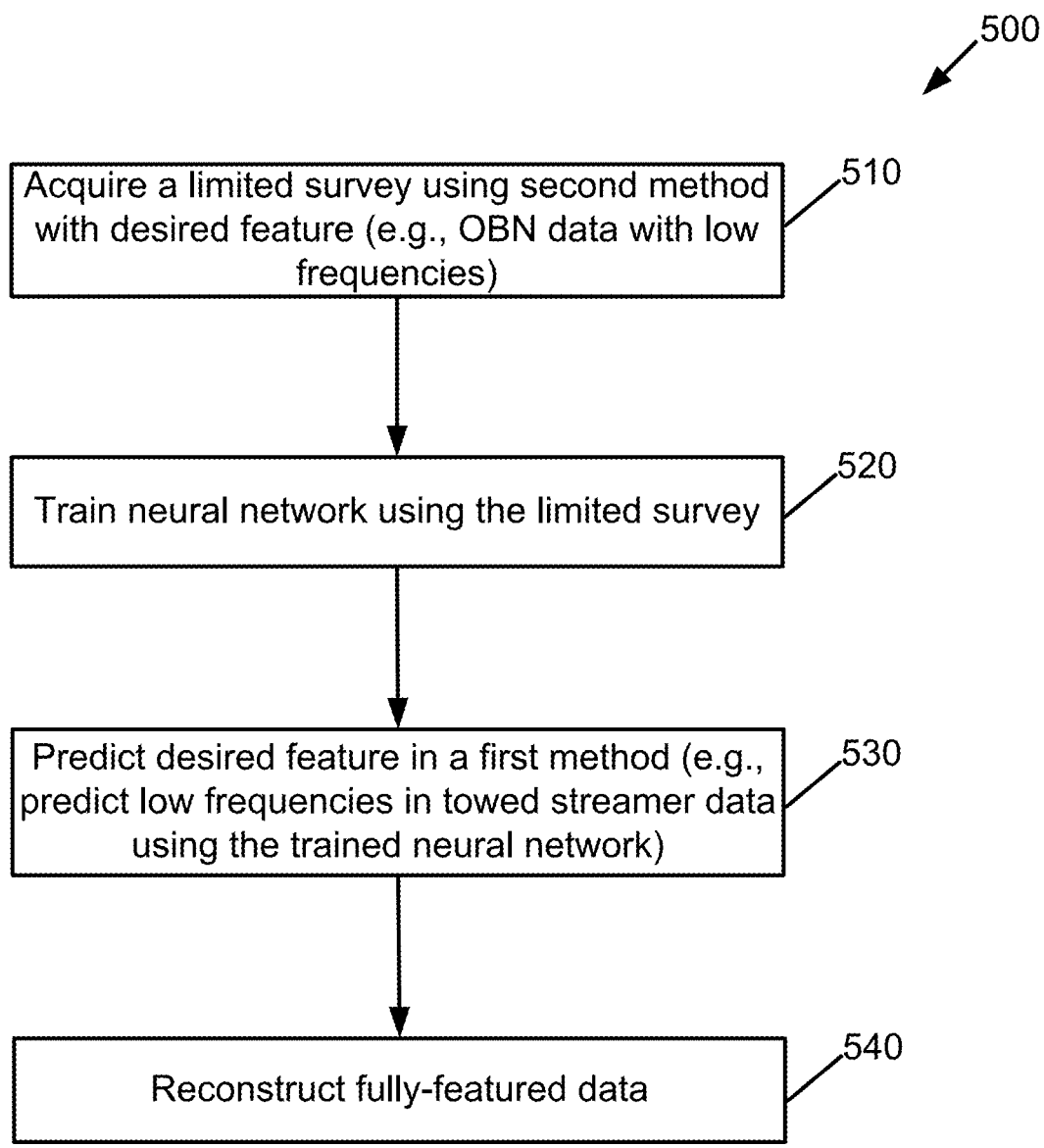
FIG. 5A is a flow chart for training the neural network and applying the trained neural network.

FIG. 5A is a flow chart 500 for training the neural network and applying the trained neural network. At 510, a limited survey using a second method with desired feature is acquired. For example, OBN data, with reliable data in low frequencies (e.g., 1-4 Hz), may be obtained. At 520, the neural network is trained using part or all of the limited survey.

Figure 5B:
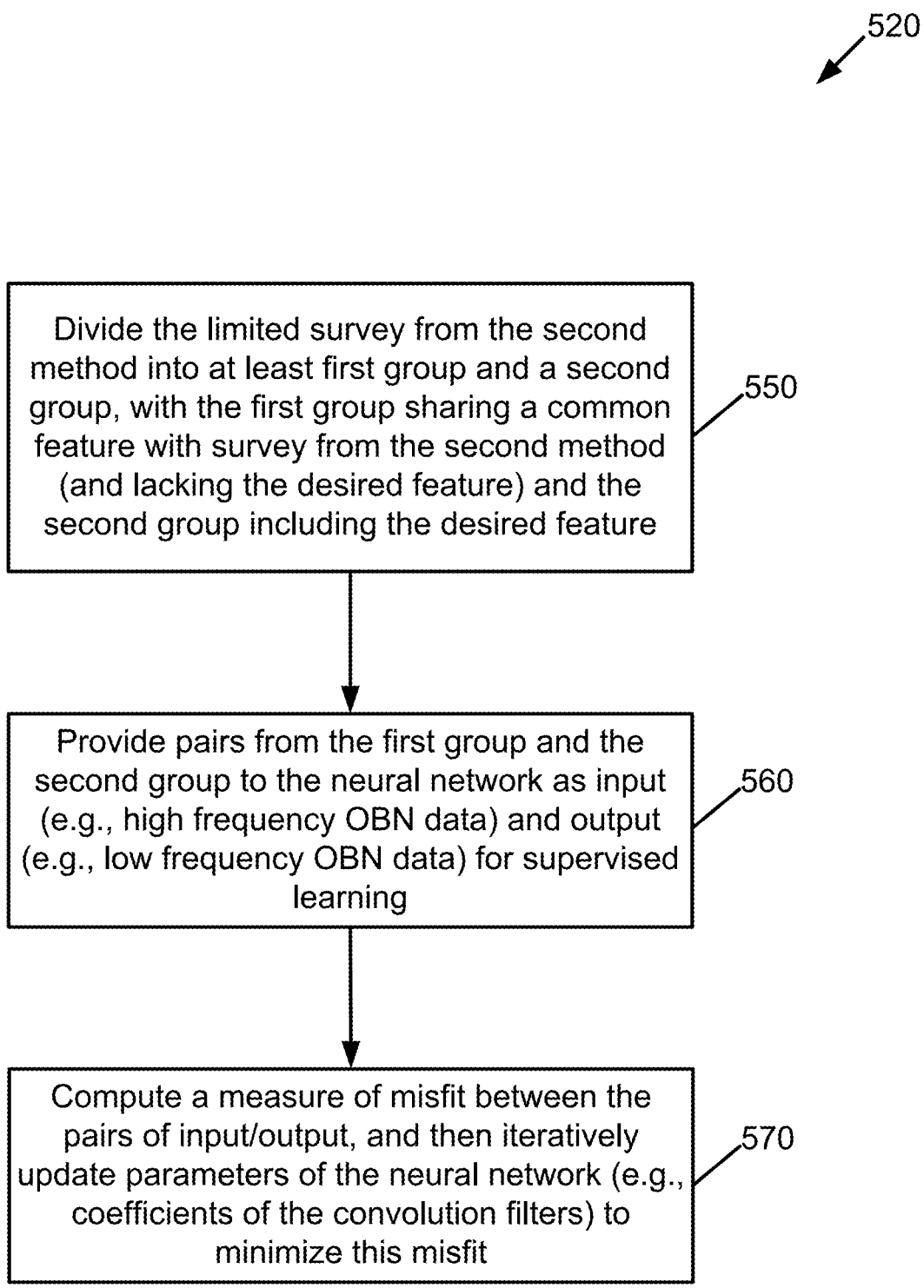
FIG. 5B is a flow chart expanding on the training of the neural network in FIG. 5A.
Figure 6A:
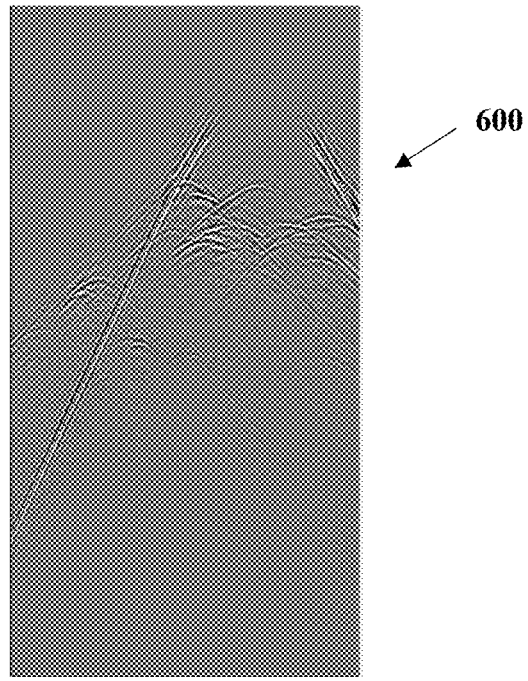
FIGS. 6A-B illustrate a first set of images of OBN gather pairs, with FIG. 6A illustrating an image of observed high frequency data (e.g., 4-15 Hz) and FIG. 6B illustrating an image of observed low frequency data (e.g., 1-4 Hz).
Figure 6B:
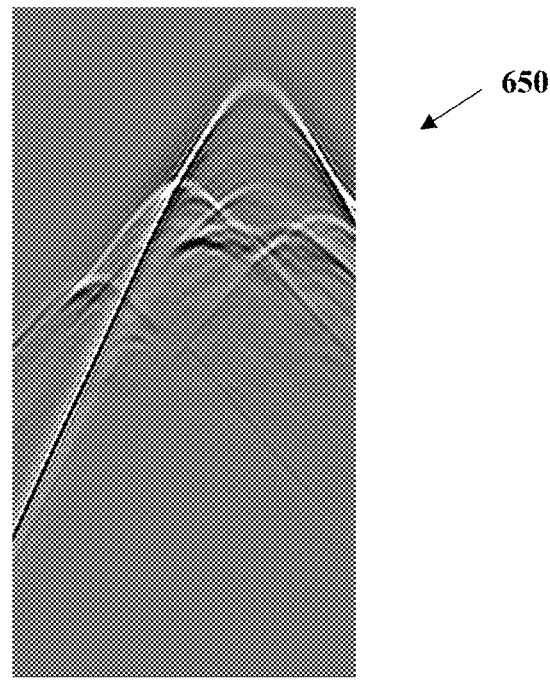
Figure 7A:
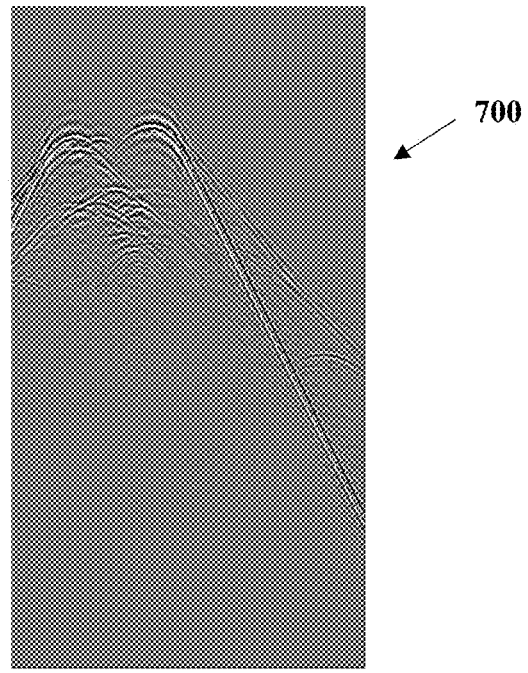
FIGS. 7A-B illustrate a second set of images of OBN gather pairs, with FIG. 7A illustrating an image of observed high frequency data (e.g., 4-15 Hz) and FIG. 7B illustrating an image of observed low frequency data (e.g., 1-4 Hz).
Figure 7B:
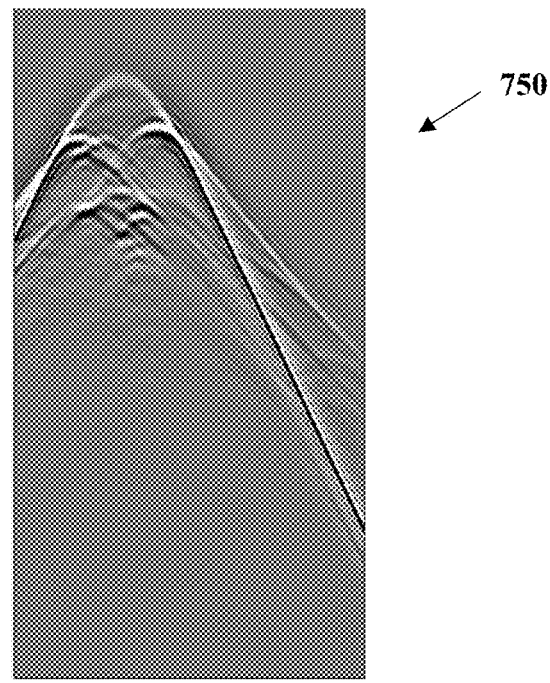

For example, FIG. 5B is a flow chart expanding on the training at 520 of the neural network in FIG. 5A. In one or some embodiments, the limited survey into split or partitioned into specific input and output datasets, thereby assisting in the supervised training of the neural network. Specifically, at 550, the limited survey may be divided into at least a first group and a second group, with the first group acting as input to training the neural network and sharing a common feature with the survey from the first method (and lacking the desired feature) and the second group acting as the desired output from training the neural network including the desired feature. In the example of bandwidth extension, the first group may comprise frequencies for OBN data that are outside of the desired bandwidth (such as frequencies 4-15 Hz that are outside of the range of 1-4 Hz) and that are also common frequencies for towed streamer data that are outside of the desired bandwidth (such as frequencies 4-15 Hz). Further, with bandwidth extension, the second group comprises frequencies for OBN data that are within or coextensive with the desired bandwidth (such as the range of 1-4 Hz).

At 560, pairs from the first group and the second group are provided to the neural network as training input (e.g., high frequency OBN data) and training output (e.g., low frequency OBN data) for supervised learning. At 570, a measure of misfit between the pairs of input/output is computed, and then parameters of the neural network (e.g., coefficients of the convolution filters) are iteratively updated to minimize this misfit in order to perform the training of the neural network.

After the neural network is trained, at 530, the desired feature(s) in a first method are predicted using the trained neural network. For example, with bandwidth extension, lower frequencies in towed streamer data are predicted using the trained neural network. Further, with the desired feature (s), at 540, the fully-featured data is reconstructed, and may be used in one of several ways, such as to produce a fully-featured model of the subsurface.

Figure 1B:
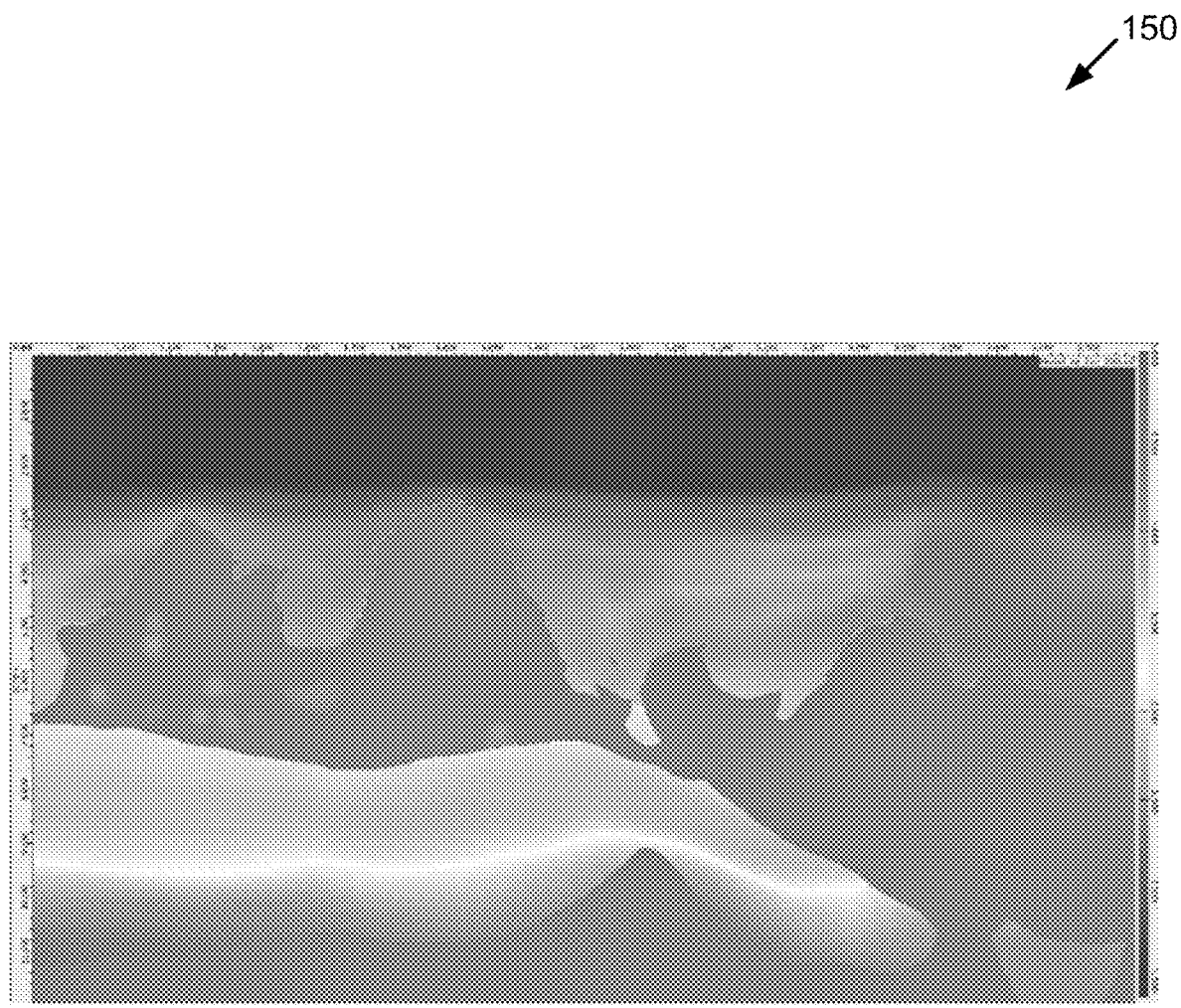
FIG. 1B is example depiction of a velocity model used for simulating synthetic data.

As one example of an application of the methodology, a synthetic dataset was generated based on the velocity model shown in FIG. 1. The synthetic dataset was used for purposes of illustration. As discussed above, in one or some embodiments, actual field data (such as obtained from the same area as the data lacking the desired feature) may be used. First, 500 sources were placed spaced every 50 m at the depth of 7 m below the top of the model. To simulate streamer acquisition geometry, 500 receivers were also placed to be spaced every 12.5 m at the depth of 9 m below the top of the model on one side of each source, thus emulating a typical towed streamer survey. Alternatively, for the simulation, receivers may be placed on only one side of the source. This experiment was then repeated, but with 500 receivers spaced every 50 m and placed at the depth of 2 km, mimicking receiver placement at the water bottom, as commonly done in OBN surveys. The numbers, spacing, and depth of receivers are merely for illustration purposes.

In preparation for training the neural network, each recorded gather was split into a pair of high frequency (e.g., 4-15 Hz) and low frequency (e.g., 1-4 Hz) gathers. FIGS. 6A-B and 7A-B are two examples, respectively, of the split into pairs of observed high frequency and low frequency gathers, with a first split into high frequency (image 600 in FIG. 6A) and low frequency (image 650 in FIG. 6B) gathers, and a second split into high frequency (image 700 in FIG. 7A) and low frequency (image 750 in FIG. 7B) gathers.

Figure 8A:
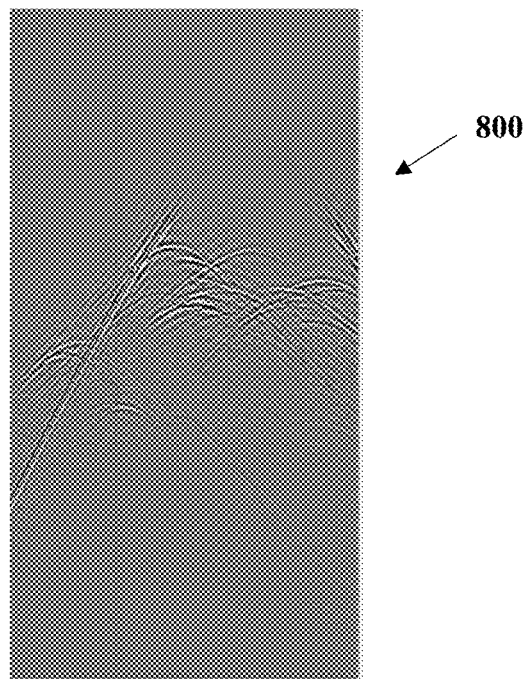
FIGS. 8A-B illustrate a first set of images of towed streamer gathers, with FIG. 8A illustrating an image of observed high frequency towed streamer data (e.g., 4-15 Hz) that was recorded and FIG. 8B illustrating an image of observed low frequency towed streamer data (e.g., 1-4 Hz) that is sought to be reconstructed by using the trained neural network that has been recreated using the trained neural network.
Figure 8B:
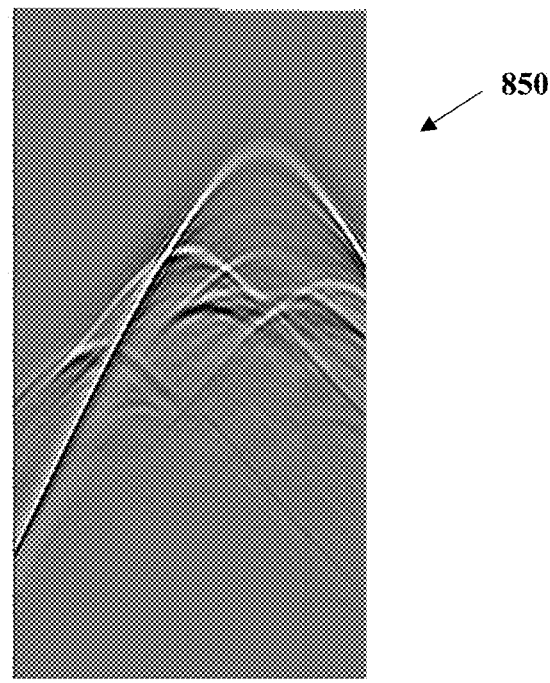
Figure 9A:
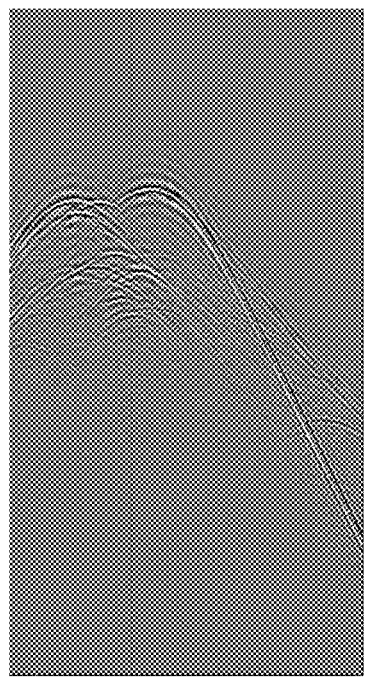
FIGS. 9A-B illustrate a second set of images of towed streamer gathers, with FIG. 9A illustrating an image of high frequency towed streamer data (e.g., 4-15 Hz) that was recorded and FIG. 9B illustrating an image of low frequency towed streamer data (e.g., 1-4 Hz) that is sought to be reconstructed by using the trained neural network.
Figure 9B:
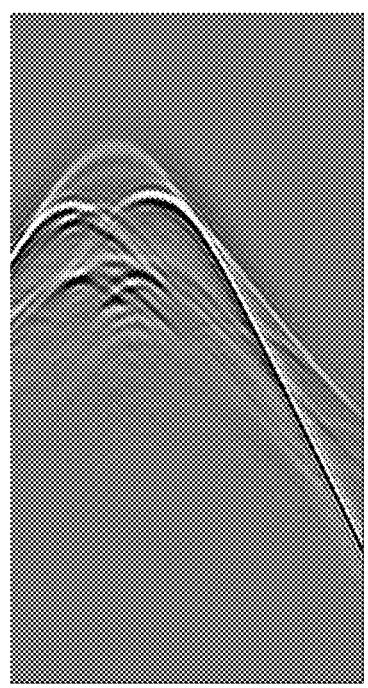

The trained network was then used to predict low frequencies from their high-frequency counterparts for streamer data. FIGS. 8A-B illustrate a first set of images of towed streamer gathers, with FIG. 8A illustrating an image 800 of observed high frequency towed streamer data (e.g., 4-15 Hz) that was recorded and FIG. 8B illustrating an image 850 of observed low frequency towed streamer data (e.g., 1-4 Hz) that is sought to be reconstructed by using the trained neural network that has been recreated using the trained neural network. FIGS. 9A-B illustrate a second set of images of towed streamer gathers, with FIG. 9A illustrating an image 900 of high frequency towed streamer data (e.g., 4-15 Hz) that was recorded and FIG. 9B illustrating an image 950 of low frequency towed streamer data (e.g., 1-4 Hz) that is sought to be reconstructed by using the trained neural network.

Figure 10A:
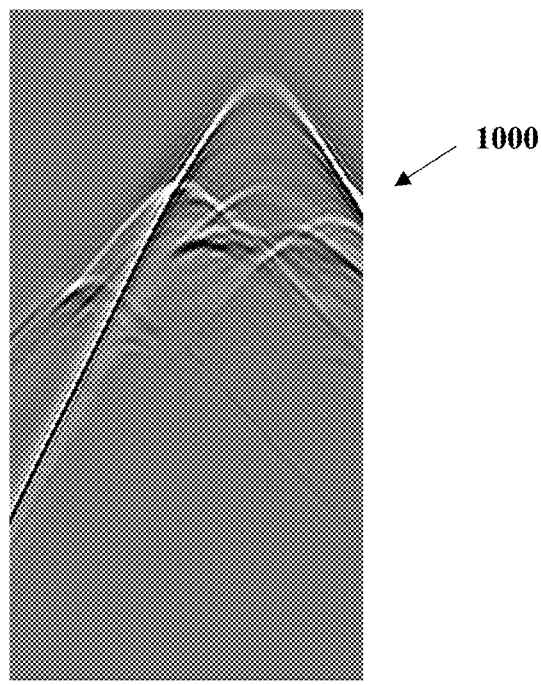
FIGS. 10A-B illustrate a first set of reconstructed gathers, with FIG. 10A illustrating an image of a reconstructed OBN gather and FIG. 10B illustrating an image of a reconstructed streamer gather.
Figure 10B:
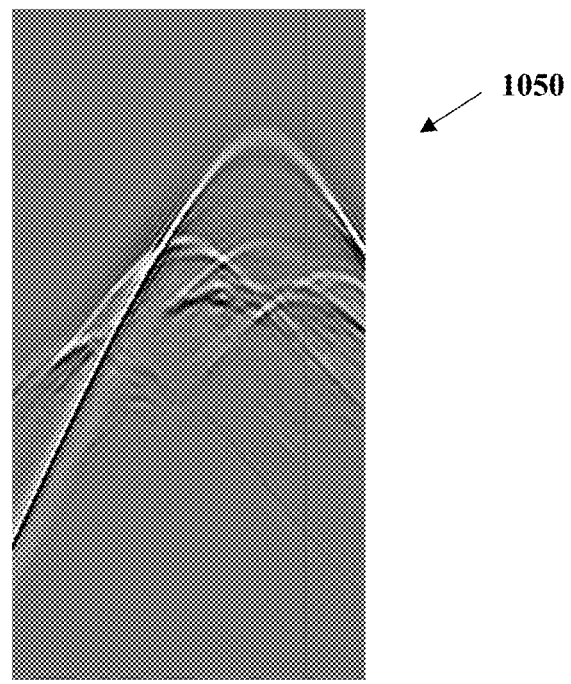
Figure 11A:
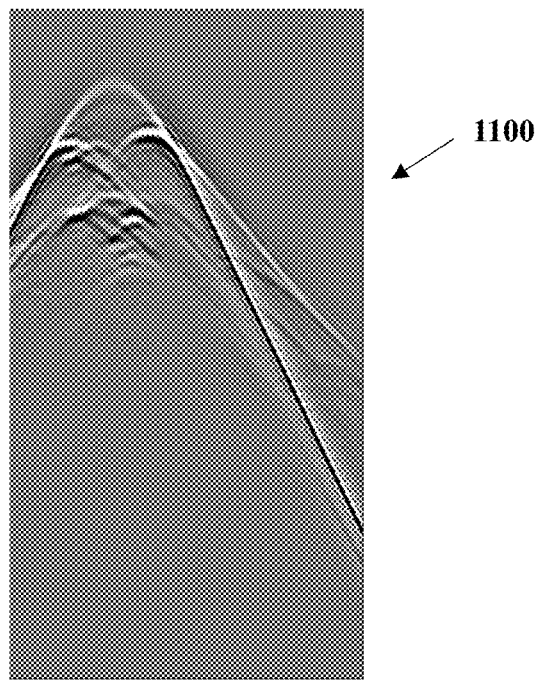
FIGS. 11A-B illustrate a second set of reconstructed gathers, with FIG. 11A illustrating an image of a reconstructed OBN gather and FIG. 11B illustrating an image of a reconstructed streamer gather.
Figure 11B:
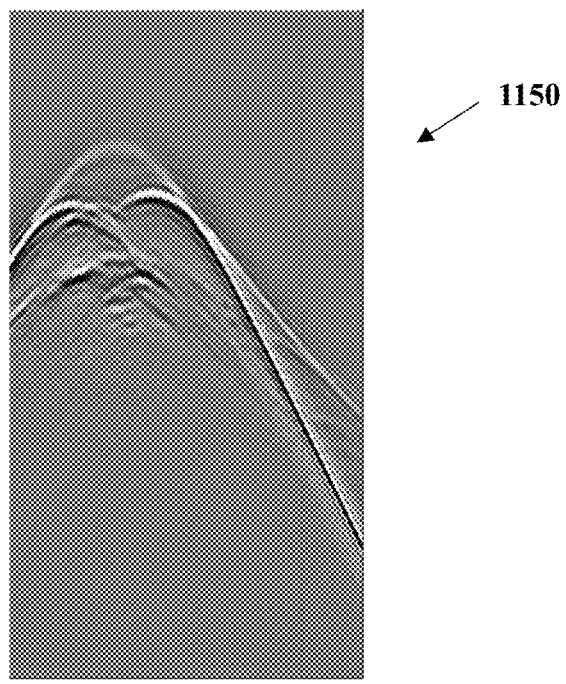

FIGS. 10A-B illustrate a first set of reconstructed gathers, with FIG. 10A illustrating an image 1000 of a reconstructed OBN gather and FIG. 10B illustrating an image 1050 of a reconstructed streamer gather. FIGS. 11A-B illustrate a second set of reconstructed gathers, with FIG. 11A illustrating an image 1100 of a reconstructed OBN gather and FIG. 11B illustrating an image 1150 of a reconstructed streamer gather.

As discussed above, FIGS. 6B and 7B are directly modeled (observed, desired) low frequency OBN, whereas FIGS. 8B and 9B are directly modeled (observed, desired) low frequency streamer. Further, FIGS. 10A and 11A are reconstructed OBN (e.g., output from neural net), whereas FIGS. 10B and 11B are reconstructed streamer (e.g., output from neural net). Analyzing the data, it appears that the data from the trained neural network for OBN data in FIGS. 10A and 11A compare favorably to the observed data from FIGS. 6B and 7B. Of greater importance, the data from the trained neural network for towed streamer data in FIGS. 10B and 11B compare favorably to the observed data from FIGS. 8B and 9B. Thus, it appears that one goal of the methodology, to obtain a sufficient prediction of low frequencies which may be missing in the towed streamer data, may be achieved using the trained neural network. Though the OBN data illustrated in FIGS. 10A and 11A is of better quality than the low frequency prediction for towed stream data as illustrated in FIGS. 10B and 11B, the key features are nevertheless captured. In this regard, the methodology may be sufficient to improve various seismic imaging calculations reliant on towed streamer data, such as improve the quality of FWI compared to performing FWI without any frequencies in the 1-4 Hz range. Examples of FWI are disclosed in U.S. Pat. Nos. 10,310,113 and 10,459,096, both of which are incorporated by reference herein in their entirety.

Figure 12:
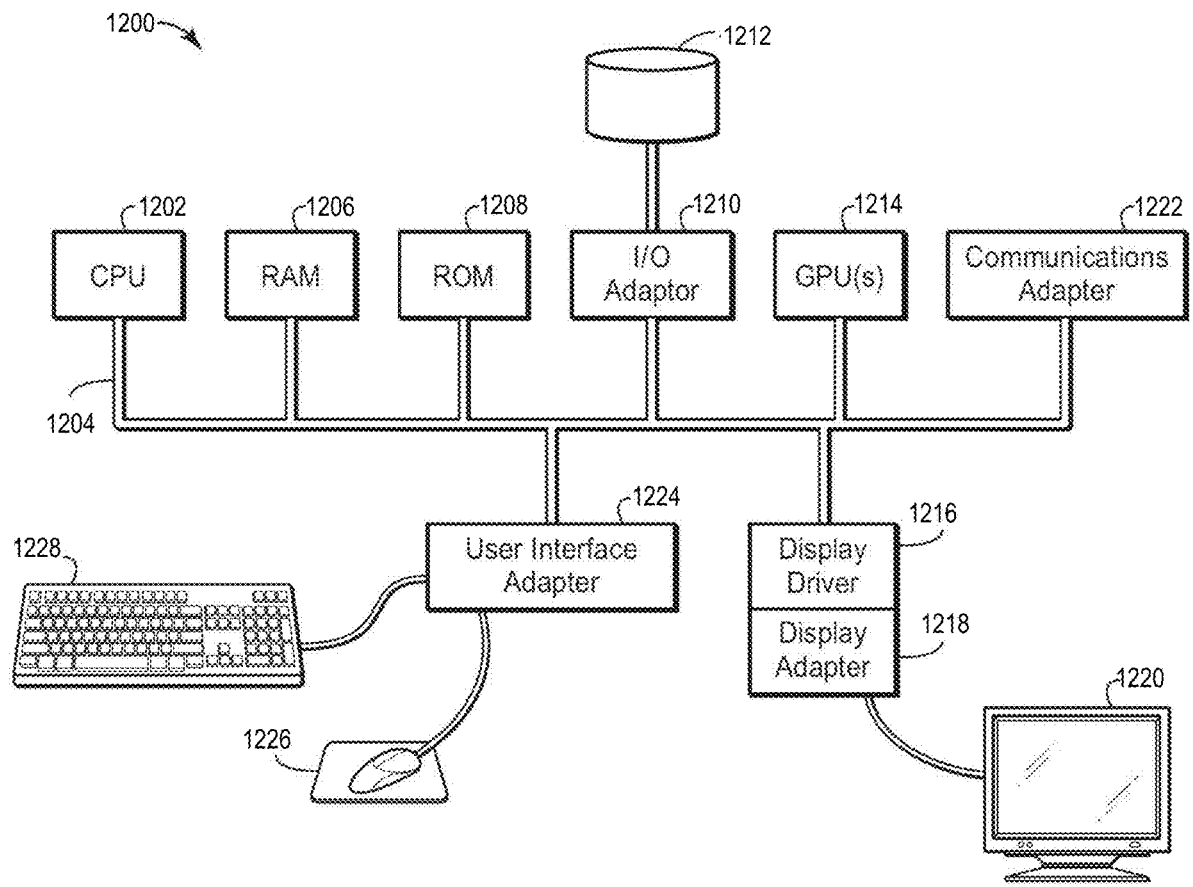
FIG. 12 is a diagram of an exemplary computer system that may be utilized to implement the methods described herein.

In all practical applications, the present technological advancement must be used in conjunction with a computer, programmed in accordance with the disclosures herein. For example, FIG. 12 is a diagram of an exemplary computer system 1200 that may be utilized to implement methods described herein. A central processing unit (CPU) 1202 is coupled to system bus 1204. The CPU 1202 may be any general-purpose CPU, although other types of architectures of CPU 1202 (or other components of exemplary computer system 1200) may be used as long as CPU 1202 (and other components of computer system 1200) supports the operations as described herein. Those of ordinary skill in the art will appreciate that, while only a single CPU 1202 is shown in FIG. 12, additional CPUs may be present. Moreover, the computer system 1200 may comprise a networked, multi-processor computer system that may include a hybrid parallel CPU/GPU system. The CPU 1202 may execute the various logical instructions according to various teachings disclosed herein. For example, the CPU 1202 may execute machine-level instructions for performing processing according to the operational flow described.

The computer system 1200 may also include computer components such as non-transitory, computer-readable media. Examples of computer-readable media include computer-readable non-transitory storage media, such as a random access memory (RAM) 1206, which may be SRAM, DRAM, SDRAM, or the like. The computer system 1200 may also include additional non-transitory, computer-readable storage media such as a read-only memory (ROM) 1208, which may be PROM, EPROM, EEPROM, or the like. RAM 1206 and ROM 1208 hold user and system data and programs, as is known in the art. The computer system 1200 may also include an input/output (I/O) adapter 1210, a graphics processing unit (GPU) 1214, a communications adapter 1222, a user interface adapter 1224, a display driver 1216, and a display adapter 1218.

The I/O adapter 1210 may connect additional non-transitory, computer-readable media such as storage device(s) 1212, including, for example, a hard drive, a compact disc (CD) drive, a floppy disk drive, a tape drive, and the like to computer system 1200. The storage device(s) may be used when RAM 1206 is insufficient for the memory requirements associated with storing data for operations of the present techniques. The data storage of the computer system 1200 may be used for storing information and/or other data used or generated as disclosed herein. For example, storage device(s) 1212 may be used to store configuration information or additional plug-ins in accordance with the present techniques. Further, user interface adapter 1224 couples user input devices, such as a keyboard 1228, a pointing device 1226 and/or output devices to the computer system 1200. The display adapter 1218 is driven by the CPU 1202 to control the display on a display device 1220 to, for example, present information to the user such as subsurface images generated according to methods described herein.

The architecture of computer system 1200 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1200 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed.

Embodiment 1

A computer-implemented method of enhancing geophysical datasets, the method comprising: accessing a first geophysical dataset obtained via a first geophysical data gathering technique and a second geophysical dataset via a second geophysical data gathering technique, wherein the first geophysical data gathering technique is of a different type than the second geophysical data gathering technique, wherein the first geophysical dataset and the second geophysical dataset include at least one common attribute, wherein the first geophysical dataset is lacking at least one feature due to greater noise or due to a failure to obtain the at least one feature than in the second geophysical dataset; training a neural network using at least part or all of the second geophysical dataset in order for the trained neural network to reconstruct the at least one feature; and applying the trained neural network by inputting at least a part of the first geophysical dataset to the trained neural network in order for the trained neural network to reconstruct the at least one feature for the first geophysical dataset.

Embodiment 2

The method of embodiment 1, wherein the at least one feature comprises a frequency band.

Embodiment 3

The method of any of embodiments 1 or 2, wherein the first geophysical dataset comprises towed streamer data; and wherein the second geophysical dataset comprises ocean bottom nodes (OBN) data.

Embodiment 4

The method of any of embodiments 1-3, wherein the towed streamer data includes a higher frequency range of towed streamer data of greater reliability than a lower frequency range of towed streamer data of lower reliability or as being unavailable; and wherein reconstructing the at least one feature for the first geophysical dataset comprises reconstructing the lower frequency range of towed streamer data.

Embodiment 5

The method of any of embodiments 1-4, wherein the OBN data includes lower frequency OBN data and higher frequency OBN data; wherein training the neural network comprises supervised machine learning using the higher frequency OBN data as input and the lower frequency OBN data as output; and wherein applying the trained neural network comprises inputting the higher frequency range of the towed streamer data to the trained neural network in order for the trained neural network to generate the lower frequency range of the towed streamer data.

Embodiment 6

The method of any of embodiments 1-5, further comprising preprocessing the higher frequency range of the towed streamer data; and wherein the preprocessed higher frequency range of the towed streamer data are input to the trained neural network.

Embodiment 7

The method of any of embodiments 1-6, wherein preprocessing the higher frequency range of the towed streamer data comprises modifying at least one aspect of the higher frequency range of the towed streamer data in order for the higher frequency range of the towed streamer data to be more similar to the higher frequency OBN data.

Embodiment 8

The method of any of embodiments 1-7, wherein preprocessing comprises migration of the higher frequency range of the towed streamer data.

Embodiment 9

The method of any of embodiments 1-8, wherein the at least one feature is based on azimuth.

Embodiment 10

The method of any of embodiments 1-9, wherein the first geophysical dataset comprises towed streamer data with narrow azimuth; wherein the second geophysical dataset comprises ocean bottom nodes (OBN) data with wider azimuth; and wherein applying the trained neural network comprises inputting the towed streamer data to the trained neural network in order for the trained neural network to widen the azimuth of the towed streamer data.

Embodiment 11

The method of any of embodiments 1-10, wherein the at least one feature comprises both low frequency and wide azimuth.

Embodiment 12

The method of any of embodiments 1-11, wherein the at least one feature comprises a higher frequency range; wherein the first geophysical dataset comprises towed streamer data, the towed streamer data including a lower frequency range of towed streamer data of greater reliability than the higher frequency range of towed streamer data of lower reliability or as being unavailable; and wherein the second geophysical dataset comprises near-field hydrophone data.

Embodiment 13

The method of any of embodiments 1-12, further comprising partitioning the second geophysical dataset into a first portion of the second geophysical dataset and a second portion of the second geophysical dataset, the first portion of the second geophysical dataset at least partly not including the at least one feature and the second portion of the second geophysical dataset at least partly including the at least one feature; and wherein training the neural network comprises supervised machine learning using the first portion of the second geophysical dataset as input and the second portion of the second geophysical dataset as output.

Embodiment 14

The method of any of embodiments 1-13, wherein the first portion of the second geophysical dataset entirely excludes the at least one feature and the second portion of the second geophysical dataset entirely includes the at least one feature.

Embodiment 15

The method of any of embodiments 1-14, wherein the at least one feature comprises a specific frequency band; wherein the first portion of the second geophysical dataset is outside of the specific frequency band; and wherein the second portion of the second geophysical dataset is at least partly within the specific frequency band.

Embodiment 16

The method of any of embodiments 1-15, wherein the at least one feature comprises wider azimuth; wherein the first portion of the second geophysical dataset has a narrower azimuth; and wherein the second portion of the second geophysical dataset comprises the wider azimuth.

Embodiment 17

The method of any of embodiments 1-16, wherein the second geophysical dataset obtained via the second geophysical data gathering technique is sparser than conventional datasets obtained via the second geophysical data gathering technique by at least a factor of 5.

Embodiment 18

The method of any of embodiments 1-17, wherein the second geophysical dataset obtained via the second geophysical data gathering technique is sparser than the first geophysical dataset obtained via the first geophysical data gathering technique by at least a factor of 5.

Embodiment 19

The method of any of embodiments 1-18, wherein the at least one common attribute comprises a same geographical area.

Embodiment 20

The method of any of embodiments 1-19, wherein the at least one common attribute comprises a same geographical region.

Embodiment 21

The method of any of embodiments 1-20, further comprising:
generating an image based on the reconstructed at least one feature for the first geophysical dataset; and outputting the image on a display, the image for managing hydrocarbons in a subsurface.

Embodiment 22

A non-transitory computer readable medium having stored thereon software instructions that, when executed by a processor, cause the processor to perform the method of any of embodiments 1-21.

Embodiment 23

A system comprising a processor and a memory, the processor in communication with the memory, the memory having stored thereon software instructions that, when executed by the processor, cause the processor to perform the method of any of embodiments 1-21.

REFERENCES

The following references are hereby incorporated by reference herein in their entirety:

Hu, W., 2014, FWI without low frequency data-beat tone inversion: 84th Annual International Meeting, SEG, Expanded Abstracts Jin, Y., W. Hu, X. Wu, and J. Chen, 2018, Learn Low Wavenumber Information in FWI via Deep Inception Based Convolutional Networks: 88th Annual International Meeting, SEG, Expanded Abstracts Sun, H. and L. Demanet, 2018, Low frequency extrapolation with deep learning: 88th Annual International Meeting, SEG, Expanded Abstracts Ovcharenko, O., V. Kazei, D. Peter, X. Zhang, and T. Alkhalifah, 2018, Low-Frequency Data Extrapolation Using a Feed-Forward ANN: 80th EAGE Conference and Exhibition, Expanded Abstracts van den Oord, A. et al., Wavenet: A generative Model for Raw Audio, arXiv, 2016.

The invention claimed is:

1. A computer-implemented method of enhancing geophysical datasets, the method comprising:
    accessing a first geophysical dataset obtained via a first geophysical data gathering technique and a second geophysical dataset via a second geophysical data gathering technique, wherein the first geophysical data gathering technique is of a different type than the second geophysical data gathering technique, wherein the first geophysical dataset and the second geophysical dataset include at least one common attribute, wherein the first geophysical dataset is lacking at least one feature due to greater noise or due to a failure to obtain the at least one feature than in the second geophysical dataset, wherein the first geophysical data set includes a higher frequency range of data of greater reliability than a lower frequency range of data of lower reliability or as being unavailable;
    training a neural network using at least part or all of the second geophysical dataset in order for the trained neural network to reconstruct the at least one feature; and
    applying the trained neural network by inputting at least a part of the first geophysical dataset to the trained neural network in order for the trained neural network to reconstruct the at least one feature for the first geophysical dataset, wherein reconstructing the at least one feature for the first geophysical dataset comprises reconstructing the lower frequency range of data.

2. The method of claim 1, wherein the at least one feature comprises a frequency band.

3. The method of claim 2, wherein the first geophysical dataset comprises towed streamer data; and
    wherein the second geophysical dataset comprises ocean bottom nodes (OBN) data.

4. The method of claim 3, wherein the OBN data includes lower frequency OBN data and higher frequency OBN data;
    wherein training the neural network comprises supervised machine learning using the higher frequency OBN data as input and the lower frequency OBN data as output; and
    wherein applying the trained neural network comprises inputting the higher frequency range of the towed streamer data to the trained neural network in order for the trained neural network to generate the lower frequency range of the towed streamer data.

5. The method of claim 4, further comprising preprocessing the higher frequency range of the towed streamer data; and
    wherein the preprocessed higher frequency range of the towed streamer data are input to the trained neural network.

6. The method of claim 5, wherein preprocessing the higher frequency range of the towed streamer data comprises modifying at least one aspect of the higher frequency range of the towed streamer data in order for the higher frequency range of the towed streamer data to be more similar to the higher frequency OBN data.

7. The method of claim 6, wherein preprocessing comprises migration of the higher frequency range of the towed streamer data.

8. The method of claim 1, wherein the at least one feature is based on azimuth.

9. The method of claim 8, wherein the first geophysical dataset comprises towed streamer data with narrow azimuth;
    wherein the second geophysical dataset comprises ocean bottom nodes (OBN) data with wider azimuth; and
    wherein applying the trained neural network comprises inputting the towed streamer data to the trained neural network in order for the trained neural network to widen the azimuth of the towed streamer data.

10. The method of claim 1, wherein the at least one feature comprises both low frequency and wide azimuth.

11. A computer-implemented method of enhancing geophysical datasets, the method comprising:
    accessing a first geophysical dataset obtained via a first geophysical data gathering technique and a second geophysical dataset via a second geophysical data gathering technique, wherein the first geophysical data gathering technique is of a different type than the second geophysical data gathering technique, wherein the first geophysical dataset and the second geophysical dataset include at least one common attribute, wherein the first geophysical dataset is lacking at least one feature due to greater noise or due to a failure to obtain the at least one feature than in the second geophysical dataset;
    wherein the at least one feature comprises a higher frequency range;
    wherein the first geophysical dataset comprises towed streamer data, the towed streamer data including a lower frequency range of towed streamer data of greater reliability than the higher frequency range of towed streamer data of lower reliability or as being unavailable;
    wherein the second geophysical dataset comprises near-field hydrophone data,
    training a neural network using at least part or all of the second geophysical dataset in order for the trained neural network to reconstruct the at least one feature; and
    applying the trained neural network by inputting at least a part of the first geophysical dataset to the trained neural network in order for the trained neural network to reconstruct the at least one feature for the first geophysical dataset.

12. The method of claim 1, further comprising partitioning the second geophysical dataset into a first portion of the second geophysical dataset and a second portion of the second geophysical dataset, the first portion of the second geophysical dataset at least partly not including the at least one feature and the second portion of the second geophysical dataset at least partly including the at least one feature; and
wherein training the neural network comprises supervised machine learning using the first portion of the second geophysical dataset as input and the second portion of the second geophysical dataset as output.

13. The method of claim 12, wherein the first portion of the second geophysical dataset entirely excludes the at least one feature and the second portion of the second geophysical dataset entirely includes the at least one feature.

14. The method of claim 12, wherein the at least one feature comprises a specific frequency band;
wherein the first portion of the second geophysical dataset is outside of the specific frequency band; and
wherein the second portion of the second geophysical dataset is at least partly within the specific frequency band.

15. The method of claim 12, wherein the at least one feature comprises wider azimuth;
wherein the first portion of the second geophysical dataset has a narrower azimuth; and
wherein the second portion of the second geophysical dataset comprises the wider azimuth.

16. The method of claim 1, wherein the second geophysical dataset obtained via the second geophysical data gathering technique has less data than conventional datasets obtained via the second geophysical data gathering technique by at least a factor of 5.

17. The method of claim 1, wherein the second geophysical dataset obtained via the second geophysical data gathering technique has less data than the first geophysical dataset obtained via the first geophysical data gathering technique by at least a factor of 5.

18. The method of claim 1, wherein the at least one common attribute comprises a same geographical area or a same geographical region.

19. The method of claim 1, further comprising:
generating an image based on the reconstructed at least one feature for the first geophysical dataset; and
outputting the image on a display, the image for managing hydrocarbons in a subsurface.

* * * * *